Oct. 1, 1968   W. WILSON   3,403,654

WATERCRAFT PROPULSION

Filed Dec. 30, 1965   8 Sheets-Sheet 1

*INVENTOR.*
WAYNE WILSON

Oct. 1, 1968  W. WILSON  3,403,654
WATERCRAFT PROPULSION
Filed Dec. 30, 1965  8 Sheets-Sheet 2

INVENTOR
WAYNE WILSON

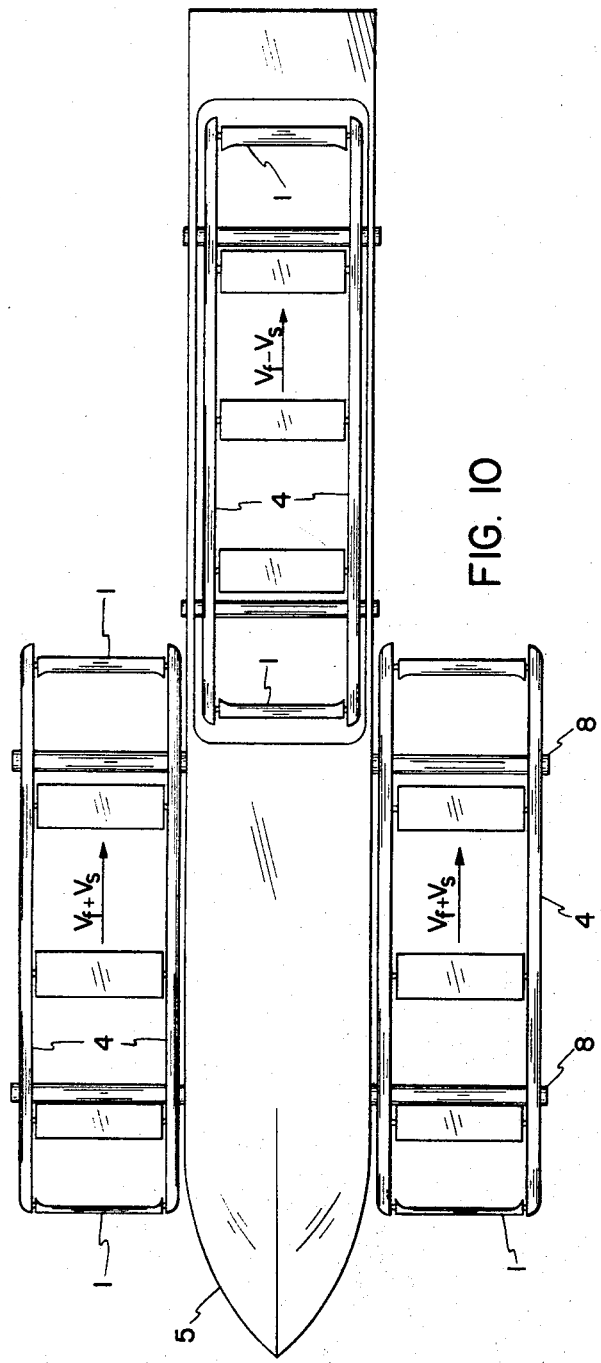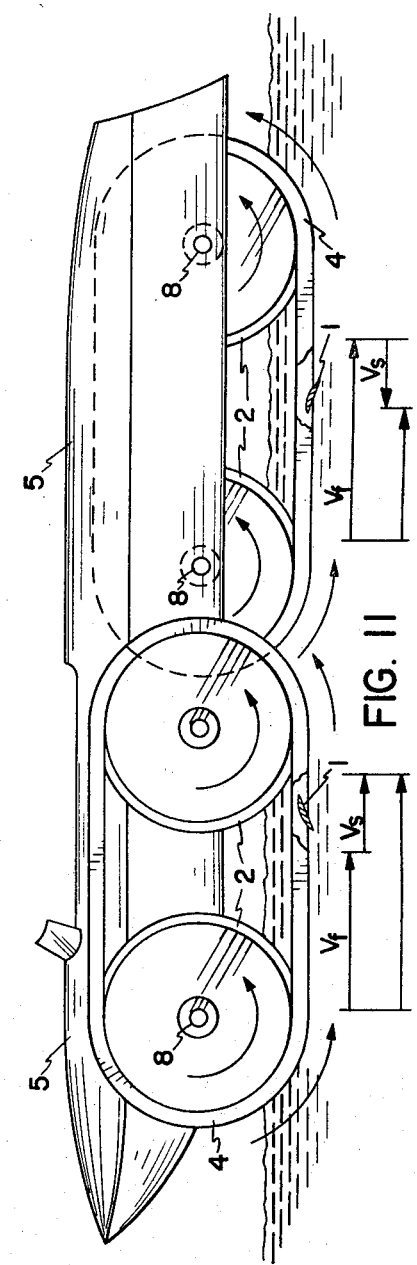

Oct. 1, 1968  W. WILSON  3,403,654
WATERCRAFT PROPULSION
Filed Dec. 30, 1965  8 Sheets-Sheet 5

INVENTOR.
WAYNE WILSON

INVENTOR.
WAYNE WILSON

Oct. 1, 1968  W. WILSON  3,403,654
WATERCRAFT PROPULSION
Filed Dec. 30, 1965  8 Sheets-Sheet 7

INVENTOR.
WAYNE WILSON

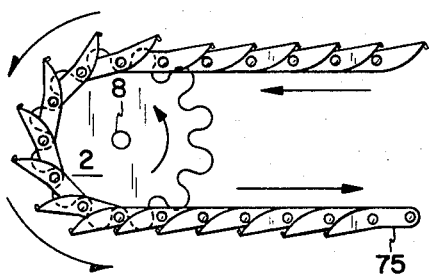
FIG. 23
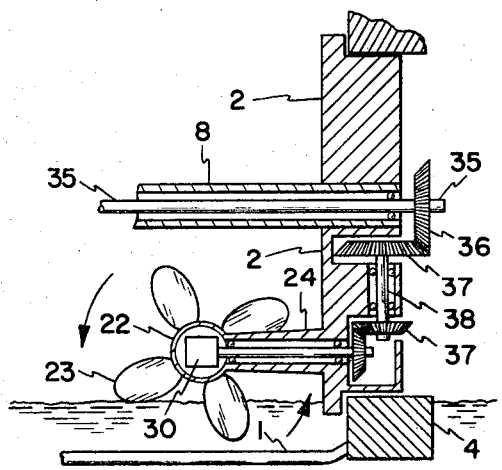
FIG. 24
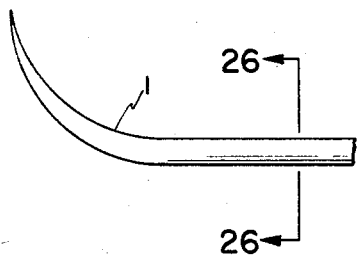
FIG. 25
FIG. 26
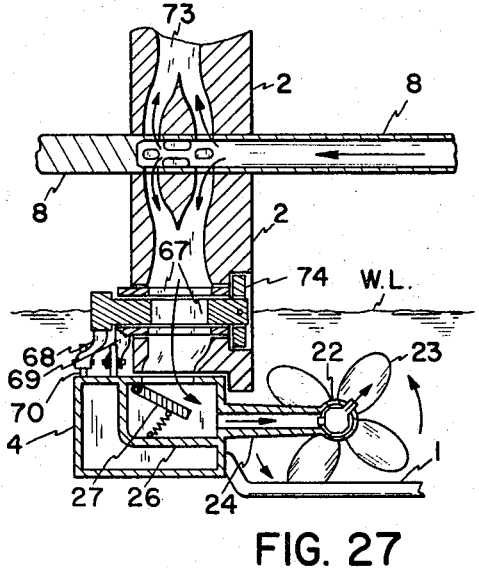
FIG. 27
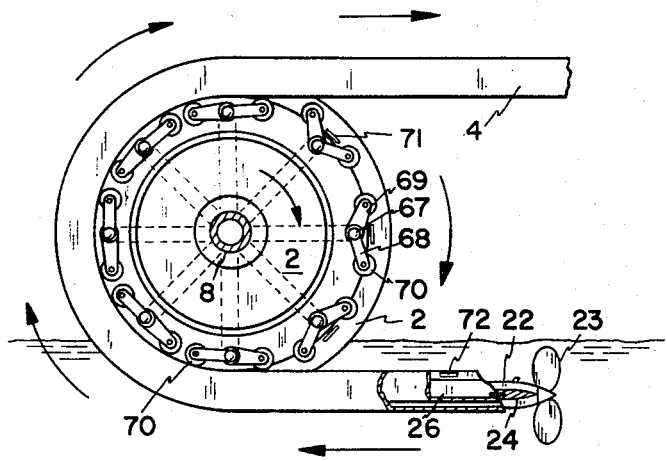
FIG. 28
INVENTOR.
WAYNE WILSON United States Patent Office 3,403,654
Patented Oct. 1, 1968

3,403,654
WATERCRAFT PROPULSION
Wayne Wilson, 1158B Westminster Ave.,
Salt Lake City, Utah 84105
Filed Dec. 30, 1965, Ser. No. 518,970
13 Claims. (Cl. 115—1)

ABSTRACT OF THE DISCLOSURE

A water propulsion system with endless driven track structure having a plurality of automatically adjustable hydrofoils such that the craft will be displaced along the surface of the water on the moving hydrofoils. An auxiliary drag unit may be attached to the craft and set in motion by the impingement of the water for the purpose of providing a supplemental source of energy. Extended wheel hubs, integral with the driving mechanism of the track, are adapted to receive ground-engaging wheels to facilitate land travel, thereby making the present craft amphibious.

---

This invention relates to a more efficient propulsion and support system for a high speed craft moveable over water than any previously used. The invention has amphibious capabilities allowing ease of operation over highway, sand, mud, snow, etc. Further, the design can allow easy substitution of regular pneumatic tires on the craft for prolonged use on hard surface roads. The invention utilizes one or more power driven continuous track consisting of one or several belts, with attached lift producing devices and/or surfaces to support the hull above and clear of the water's surface while utilizing the induced drag to propel the vehicle forward against aerodynamic and/or artificially created drag. The continuous tracks more rearward in contact with the water with a predetermined slip velocity and then lift clear of the water to change direction and return forward while not in contact with the water's surface.

Conventional watercraft such as displacement craft, hydroplanes, hydrofoil craft, must all be pushed forward through the water for operation causing substantial energy consumption due to wave making, skin friction, and induced drag, that is nonrecoverable. Energy consumption becomes so large in these craft at high speeds that commercial use becomes uneconomical. Ground effect craft consume so much energy just to hold up the vehicle that commercial use is not economical. The main object of this invention is to make watercraft operation at high speeds appear feasible. A number of proposals have been made using wheels, tracks, rollers, or rotors that function to raise the craft hull above the water at high speed and in some cases move to propel and/or reduce the water resistance to forward motion. None of these have yet proven practical.

It is an important object of this invention to provide a novel watercraft which maximizes the use of drag energy by moving lift surfaces in approximately a straight path rearward and approximately horizontal to the water's surface for the largest practical percentage of time (85% to 100%) the lift devices and/or surfaces are in contact with the water.

It is still another object to reduce the velocity needed by lift surfaces to propel the craft over the water surface.

Another important object is to provide more efficient operation in the speed region where aerodynamic drag is less than the propulsion drag of the lift devices.

It is another object to provide auxiliary device for low speed operation to create drag aiding aerodynamic drag so that the hull is easily lifted clear of the water's surface.

One still further object is to provide an auxiliary drag device which is operated by the relative displacement of the watercraft and the water whereby a supplemental source of energy is made available.

Another and no less important object of the present invention is to provide a watercraft having an endless powered track accommodating large track-water contact area for more efficiently propelling the craft.

It is another important object to provide lift surfaces that are adjustable to continuously give maximum lift and drag at any given point in time.

Another object is to utilize a continuous track that allows a reduction in number of the wheels required per track while maintaining strength and straightness of the track.

Another object is to provide a folding mechanism for hydrofoils to reduce undesirable air drag and conserve space.

It is another object to provide a propulsion system that can be used to steer and maneuver the craft at all speeds.

Other objects of the invention not specifically set forth in the preceding will become readily apparent from the following description and drawings in which:

FIGURES 2 and 3 show typical placement for use.

FIGURES 2 and 3 show typical placement.

FIGURE 10 is bottom schematic plan view of a two direction slip multiple tracked seawheel craft.

FIGURE 11 is a schematic side view of the craft in FIGURE 10.

FIGURE 23 is a partial plan view of a chain link overlap track showing multiple section construction allowing travel around the wheels while straightening into a rigid weight supporting structure.

FIGURE 24 is a view partially in cross section of one drive wheel and track showing details of an auxiliary thrust and/or drag modifier consisting of a propeller and mechanical drive therefor independent of main wheel drive.

FIGURE 25 is a front plan view of a hydrofoil blade anti-vortex tip to reduce vortex loss and gain additional lift.

FIGURE 26 is a partial section side view of the above anti-vortex tip looking in the direction indicated in FIGURE 25.

FIGURE 27 is a view in cross section of one track and drive wheel taken through the axle showing details of a hydraulic fluid transfer drive means and associated auxiliary thrust and/or drag means consisting of a propeller with hydraulic drive motor/generator powered by said fluid transfer.

FIGURE 28 is a partial cross section side view of the unit in FIGURE 27.

Figure 1:
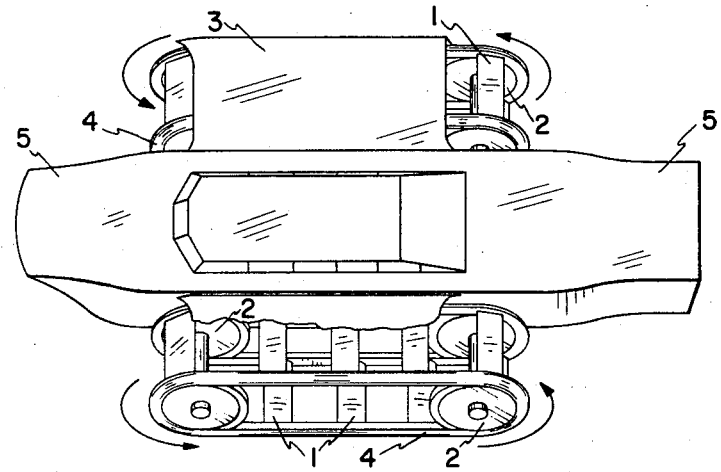
FIGURE 1 is a perspective view of an amphibious water craft incorporating the invention.

The basic invention relates to a watercraft propelled and lifted by lift surfaces attached to at least one continuous track. One embodiment (FIGURE 1) employs one track on each side of the craft with lift surfaces so arranged that they are almost parallel to and travel rearward just below or on the water's surface producing thrust and lift. Maneuvering is accomplished by driving or braking one or more of the tracks differentially producing a moment force that turns the craft. Another embodiment (FIGURE 9) could be strapped on to a boat as an outboard and maneuvered by rotating the track unit relative to the boat changing the direction of thrust. Another embodiment using one or more tracks on each side is arranged to allow easy removal of the track and drive wheels permitting replacement with pneumatic tired wheels for prolonged operation on hard surfaced roads, reducing wear.

A seawheel craft is a powered boat or marine vehicle that during normal operation has the hull and various other buoyant supporting means lifted clear of the water by one or more wheel or track units with lift surfaces which furnish thrust to propel the craft in producing lift. In this condition stationary parts of the boat do not touch the water and do not produce water drag which would hold the craft back when moving. With this source of drag eliminated only aerodynamic drag, artificially induced drag, and change of vehicle inertia produce forces to hold the craft back when moving.

Artificial drag would not be used at high speeds. Thus at high speeds the seawheel craft operation can be very efficient as compared to conventional watercraft or aircraft. Sustained operation at 50 to 300 miles per hour will be practical with the seawheel craft. Efficiency of operation will be limited only by aerodynamic drag and mechanical losses. Mechanical losses counted are bearing friction loss, transmission gear loss, prime mover inefficiency loss, and lift surface slip velocity times thrust force. The lift surfaces must slip rearward and through the water to provide lift and thrust. The slip velocity of lift surfaces relative to the water can remain almost constant no matter what the forward speed of the seawheel craft. Practical slip velocities are in the range of 8 to 30 miles per hour and depend mainly on vehicle weight and lift surface area. For a hydrofoil lift surface the commonly used equations are:

$$\text{lift} \geq \text{craft weight}$$
$$\text{lift} = C_L A V^2$$
$$\text{drag} = (D/L) \times \text{lift}$$

where
$C_L$ = coefficient of lift hydrofoil
$A$ = area of hydrofoils in water (effective)
$V$ = velocity relative to water
$D/L$ = drag to lift ratio of hydrofoil array.

A lift reserve of 2 or 3 times craft weight should be allowed for initial lift out of the craft.

Since the drawings FIGURE 1 through FIGURE 20 are all related to a few variations and parts of the basic seawheel craft, a common number identification of similar parts is used throughout the drawings. Number to part correlation is given below.

1 lift surfaces (can be planing surfaces and/or hydrofoils)
2 main wheels to drive and run endless track on
3 spray and wave shield to stop spray thrown from lift surfaces and shield forward moving lift surfaces from large oncoming waves
4 continuous or endless track is a solid or coupled segment belt to which lift surfaces attach
5 seawheel hull or body
6 individual brake unit
7 main differential with carry through drive shaft
8 drive axle
9 main drive shaft
10 motor or prime mover
11 rear axle
12 ball or roller bearing
13 individulal brake actuator
14 axle end wheel adapter for mounting auxiliary pneumatic wheels
15 low speed drag propeller
16 differential and gearbox
17 constant speed motor/generator
18 disengage clutch
19 universal joint
20 actuate line for brake
21 inside wheel adapter hub permits removal of drive wheels, and endless track and substitution of pneumatic wheels therefor
22 motor/generator auxiliary units
23 auxiliary thrust prop, track
24 auxiliary thrust unit support
25 hydraulic power line
26 hydraulic distribution manifold
27 one way valve
28 hydraulic power distributor
29 auxiliary thrust drive shaft
30 bevel gear unit
31 spur gear, special
32 small transfer sprocket 33 double link drive chain
34 chain drive sprocket
35 drive axle auxiliary
36 drive gear
37 small gear
38 small drive shaft
39 outside tube shaft drive
40 pitch change control wheel
41 pitch wheel carrier
42 activate rod, decrease pitch
43 activate rod, increase pitch
44 transfer lever
45 position hold spring
46 transfer pin
47 pivot pin main
48 pitch control pivot pin
49 lift surface bearing block
50 upper track support and guide wheel
51 anti-twist track support wheel
52 stub drive axle
53 bevel gear, drive
54 axle bevel drive gear
55 lock pin to pin or unpin bevel gear to axle
56 actuate wheel to control hydrofoil blade folding
57 support rollers for above wheel
58 spring lever to fold blade
59 preload fold spring
60 hydrofoil bearing fold block
61 ribbon actuate belt to control hydrofoil blade folding
62 optional guide wheels for above
63 individual track section
64 ribbon flexible belt
65 rigid or flexible tension member which pulls tight limiting inward bend of the track
66 protective bottom plate (may provide structural strength)

Where necessary, further description of a part and its use will be found in a section explaining in detail operation of a related parts assembly.

Unfortunately, practical lift surfaces have lift to drag ratios that are not infinite and in practice vary from 1 up to 60 with usable surfaces giving around 10 to 1 ratios. Drag of the lift surfaces is used as thrust to propel the craft forward against aerodynamic drag, artifically induced drag, and change of inertia. In order for the craft to be fully supported by the lift surfaces with the hull clear of the water, the total of forces holding back the craft must be larger or equal to the drag/lift ratio times the craft's weight.

Aerodynamic drag+artificial drag+mass
 × acceleration=(drag/lift)(craft weight)

Figure 2:
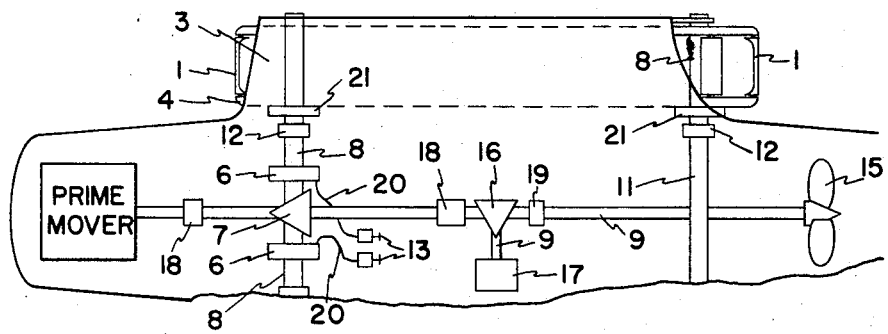
FIGURE 2 is a schematic plan view of a craft utilizing the invention and showing the hydrofoil track plus contact area and direction of track movement relative to the water (slip direction).

Experience shows that aerodynamic drag force is less than minimum thrust to produce needed lift for craft speeds below 50 to 200 miles per hour (dependent on streamlining of craft and lift/drag ratio). With aerodynamic forces only opposing thrust at these speeds the craft hull would settle and touch the water's surface thus destroying efficiency of operation. To operate lifted out at steady speeds in this speed range then an artificial drag can be created to raise total drag force to equal thrust needed from lift/drag. Artificial drag can be created in a number of ways. The simplest would be to use fixed hydrofoil and/or planing surfaces attached to the craft moving on or through the water at the same speed as the seawheel craft providing drag and additional lift as well. More efficient in the use of a propeller, impulse turbine, paddle wheel, and/or similar devices to hold back the seawheel craft with a force such that the force plus aerodynamic drag would just equal thrust. The drag created does work on the propeller and/or device used which is largely recoverable. The use of an impulse turbine, propeller, or paddle wheel could give practical efficiencies and recovery of respectively 90%, 75%, and 76%. Referring to FIGURE 1 and FIGURE 2, a drag propeller 15 is shown and would be arranged to retract clear of the water when not in use. A clutch 18 could be used to disengage or engage the propeller which at low speeds would send recovered drag energy back into the drive train. A variable pitch prop or variable gear ratio transfer unit could be used to match prop speed to drive train for drag energy recovery. A good method is shown in FIGURE 2 where the propeller 15 drives into a differential 16 which sends power into the drive train 8 and receives a constant low speed power input from unit 17 which can be an electric motor, hydraulic motor, etc. Drive train speed is K (craft velocity+slip velocity) and the output of differential 16 is J (propeller velocity—prop slip velocity+constant speed unit 17 velocity) which approximately equals drive train speed. Constant speed unit 17 velocity is set to be approximately proportional to slip velocity while propeller velocity—slip velocity is proportional to craft velocity if pitch is constant. Coefficients J and K are solved for to determine gear ratios in units so drive train speed and differential 16 output speed match. With this arrangement the prop slip velocity and lift surface slip velocity are interdependent and are self adjusting so that:

prop drag+aerodynamic drag+$MA$=lift(drag/lift)

When aerodynamic drag becomes larger than thrust the propeller slip direction reverses causing the propeller 15 to take power from the drive train and aid the lift surfaces in thrusting the vehicles forward. Thus, for any forward speed the propeller 15 can add the proper amount of thrust or drag to balance the above equation. A propeller 15 acting on the water has cavitation problems at higher speeds if a subcavitating blade section is used to provide the desired efficiency at low to medium speeds. Equally well, a propeller acting on air could be substituted for water propeller 15 with obvious shaft and gear additions to properly position the propeller in the airstream. Constant speed unit 17 velocity would now be varied slightly to account for headwinds or tail winds encountered. Drag or thrust power does not need to go into or respectively come from the drive train but can respectively drive or take power from a motor/generator unit to then be distributed as desired.

Another embodiment is shown in FIGURE 1 and FIGURE 2 that can be used alternately or in conjunction with the drag prop system described above. The embodiment consists of one or several propellers 23 and/or impulse turbine, etc. with corresponding motor/generator units 22 and power source/sink. Although more complex, this embodiment allows a more stable and efficient seawheel craft at most speeds than the drag prop system described above. The units 22 and 23 are attached to either rims of the drive wheels or preferably to each continuous track unit and arranged so that one or more units on each wheel or track are in position at all times to act on the water effectively. Four main modes of operation are possible. Mode 1 operation: the wheel and/or tracks do not move but sufficient power is applied to motor units 22 and propellers 23 to cause the craft to gain velocity backwards and lift the hull clear of the water operating in a fashion similar to a conventional hydrofoil craft. More 2 operation: wheels and/or tracks turn with direction and velocity to move the seawheel craft forward and craft hull has lifted clear of the water but forward speed is below that where thrust=aerodynamic drag. Power is supplied to motor units 22 to maintain a constant propeller 23 rotation speed. Speed and propeller pitch are such that water flows past both propeller and lift surfaces at the desired lift surface slip velocity and the craft hull stays lifted clear of the water. Examining operation it is seen that propeller 23 forward velocity minus slip velocity and lift surface slip velocity are interdependent. Wheel and/or track units provide lift surface thrust equal to aerodynamic drag+$MA$ forces while the motor 22 and prop units act directly on the water and lift surfaces to cancel the difference between lift(drag/lift) needed and aerodynamic drag+*MA* forces. When turned at the proper constant speed the slip of propellers 23 operates to properly vary the thrust produced by propellers 23 throughout the speed range. Propellers 23 produce near maximum thrust near zero speed and taper off to zero thrust where aerodynamic drag equals lift(drag/lift) needed. Mode 3 operation: the same as mode 2 except the seawheel craft is moving at a high speed where lift(drag/lift) is smaller than aerodynamic drag forces. Slip direction through the propellers 23 has therefore reversed causing drag instead of thrust that added to the lift surface drag becomes drive thrust to match aerodynamic drag+*MA* forces. The instant effect of the constant speed propeller in modes 2 and 3 as seen by the drive train is a varying apparent lift/ drag ratio to suit conditions. Apparent lift/drag can thus be infinite at zero speed and with speed increase it decreases (nearly to zero at very high speeds).

Mode 4 operation: this is an unusual method of operation that appears to be 2% to 5% more efficient than mode 2 operation in the low speed range where speed is less than half the speed at which aerodynamic drag equals lift(drag/lift ratio). For speeds above this the efficiency of mode 4 operation rapidly decreases and drops well below mode 2 efficiency. The seawheel craft, when a suitable reverse gear is available in the drive, can operate in mode 4 without modification from a mode 2 and 3 vehicle configuration. However, to do so it must travel backwards and the wheels of a vehicle viewed as FIGURE 1 would turn counterclockwise. In previous methods of operation the slip direction of the lift surfaces has been opposite to vehicle travel direction. In mode 4, however, power applied to motor 22 and propeller 23 units forces the slip direction of the lift surfaces to coincide with vehicle travel direction thus velocity of the seawheel craft equals drive wheel rim velocity plus the velocity of the water past the lift surfaces. The craft operates in a lifted out condition avoiding hull drag on the water.

Figure 7:
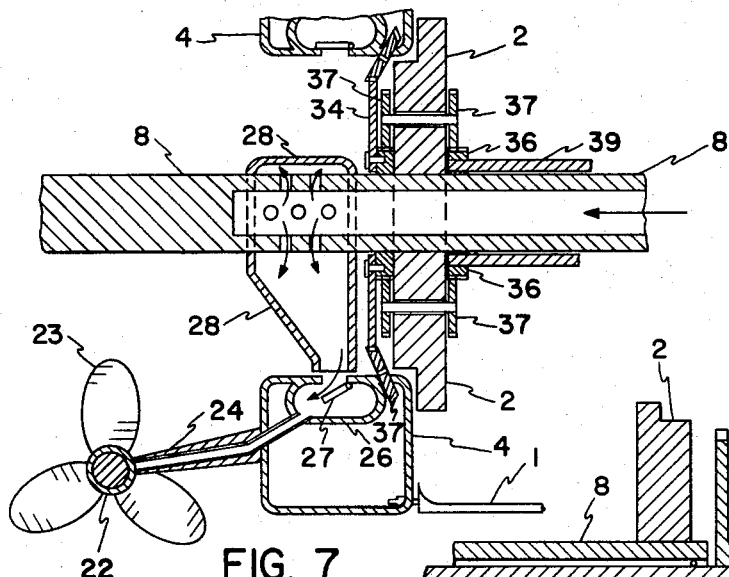
FIGURE 7 is a view partially in cross section of one track and drive wheel showing details of an auxiliary thrust and/or drag modifier consisting of a propeller with a hydraulic drive motor and means to convey hydraulic fluid under pressure or vacuum to supply drive power from the craft.
Figure 8:
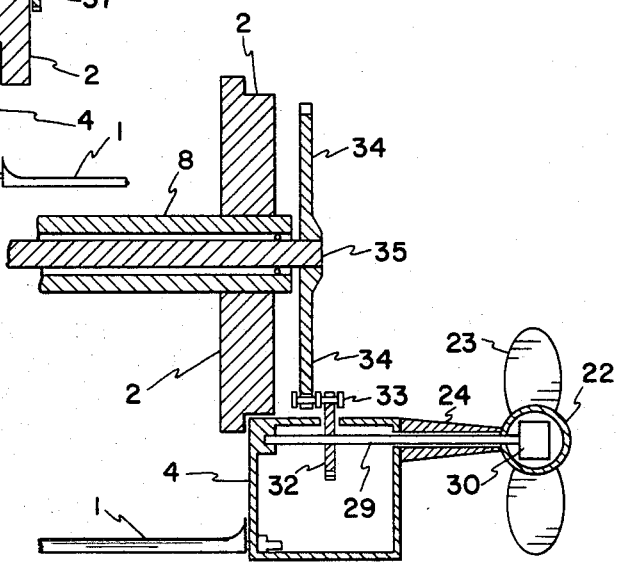
FIGURE 8 is a view partially in cross section of one track and drive wheel showing details of an auxiliary thrust and/or drag modifier consisting of a propeller and mechanical drive therefor independent of the drive wheel to supply drive power from the craft.

FIGURES 7, 8, and 24 show possible construction of motor 22 and prop units to give auxiliary thrust or drag to the track. In FIGURE 7 hydraulic fluid is being pumped into the hollow drive axle 8 and flows through holes in the axle into the distributor 28. As a track section slides past in contact pressure forces valve 27 open and fluid flows into manifold 26 that runs past and supplies fluid under pressure to each power line 25. Thus, fluid forced in at any of numerous valves 27 will spread to all hydraulic motors 22 providing power to turn propellers 23.

FIGURE 8 shows mechanical drive power coming from shaft 35 to a sprocket wheel 34 which drives chain 33. The chain parallels the endless track in contact with sprocket wheels 32 for every unit. The chain drives each sprocket wheel 32 which drives the propellers through bevel gear unit 30, shaft 29, and special spur gear 31.

FIGURE 24 shows mechanical drive power coming from shaft 35 and traveling through gear 36 to gear 37 to shaft 38 through bevel gear pair 37 through shaft 29 and bevel gear unit 30 to power the propeller. Note that this auxiliary thrust unit attaches to the wheel 2 instead of the continuous track 4 in FIGURES 7 and 8. A paddle wheel or impulse turbine attaching to the tube drive 39 in FIGURE 8 could also be used. An electric motor drive through slip rings and brushes or a self-contained power unit are other means of accomplishing.

Another means of achieving efficient low and medium speed operation is to use a multiple track seawheel chaft as shown in FIGURES 10 and 11. Notice the difference in hydrofoil direction and angle in FIGURE 11. Both side track units have a velocity of vehicle forward speed plus lift surface slip velocity so slip direction is rearward. The rear track moves at vehicle forward speed minus slip velocity so slip direction is forward. Now drag from forward and rearward slip oppose and if they are not equal in this case the difference becomes thrust to propel the seawheel against aerodynamic drag. By choosing the proper weight distribution between back and front the seawheel craft efficiency can be optimized for a particular speed in the range where aerodynamic drag is less than vehicle weight(drag/lift). Note that even with forward and backward slip directions that nonetheless all tracks turn in a counterclockwise direction.

A combination of two or more of the foregoing types of operation is workable and may be needed to get best operating efficiency at a particular speed in region I. Region I is defined as the speed range where aerodynamic drag is equal or larger than vehicle weight (drag/lift ratio). Operation with the hull in the water might be used at very low speeds and needs no further comment.

Figure 3:
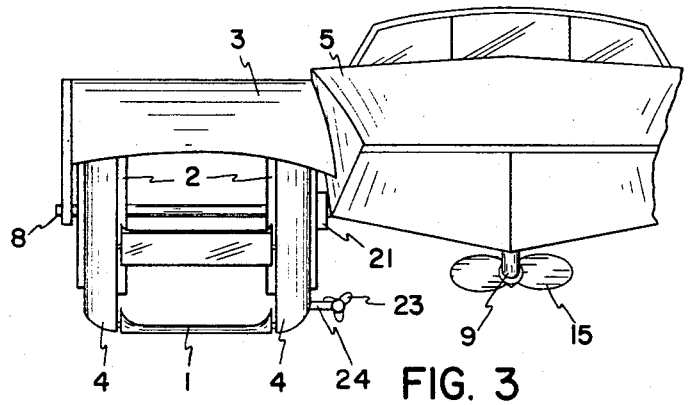
FIGURE 3 is an end view of the FIGURE 2 tracked seawheel craft.
Figure 4:
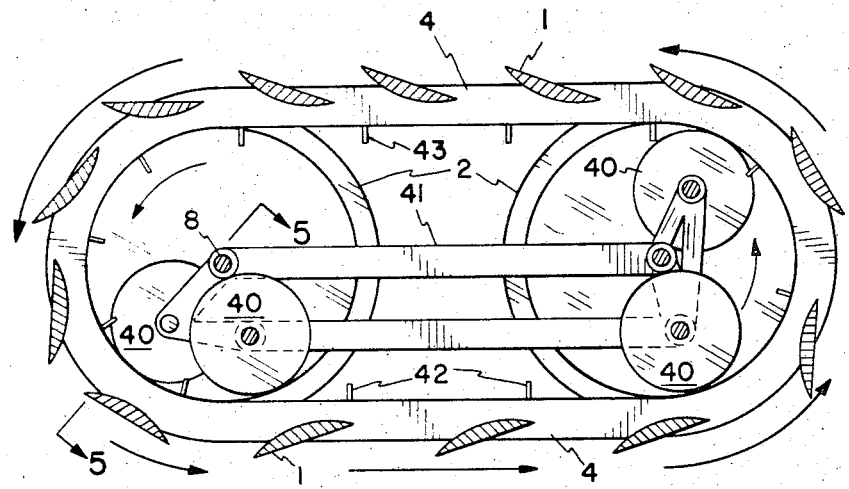
FIGURE 4 is a schematic side view of a track and hydrofoil lift surface system showing partially the cyclical pitch changes and mechanism therefor.
Figure 5:
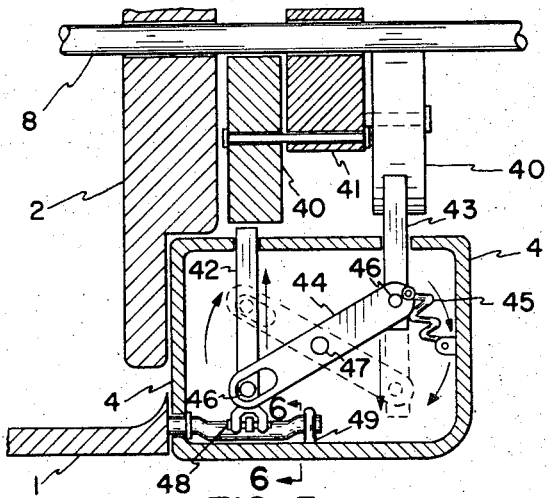
FIGURE 5 is a view partially in cross section of one track and drive wheel showing the bistable position actuating mechanism for one hydrofoil or lift surface to cyclically change pitch angle in conjunction with control wheels in FIGURE 4.
Figure 6:
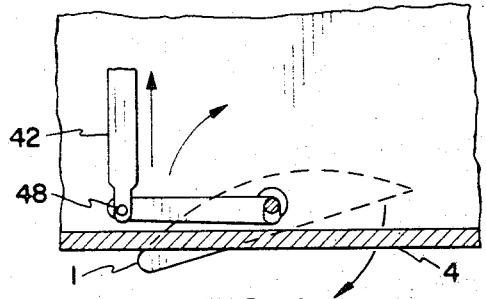
FIGURE 6 is a schematic side view of hydrofoil lift surface showing pivot point and attachment from the cyclical pitch change mechanism of FIGURE 5.
Figure 9:
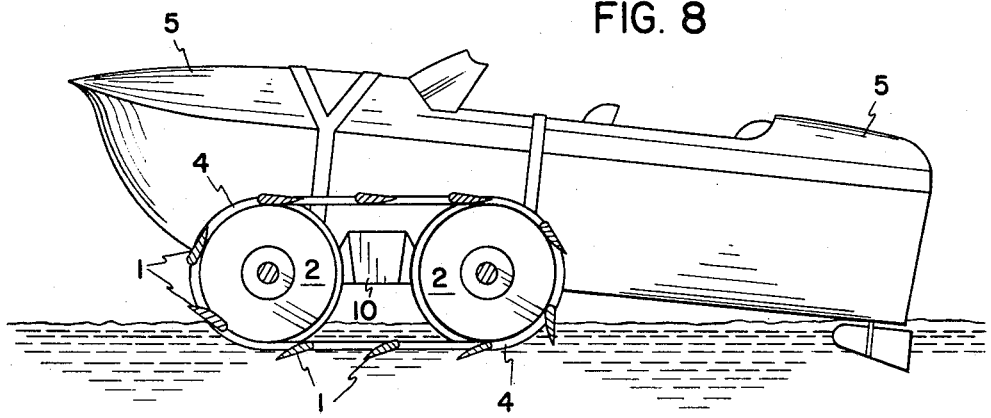
FIGURE 9 is a schematic side view of a conventional planing craft including an attached outboard type tracked seawheel lift and propulsion unit.

Lift surfaces shown in the drawings could be either hydrofoils or planing surfaces or a combination blade that is a hydrofoil at lower speeds but rises to the surface and planes at higher slip speed. Planing operation is workable and in test models gave stable operation. However, slip velocity needed is much higher than for equal area hydrofoil surfaces. A reasonable lift/drag ratio is easier to achieve with planing operation and cyclical pitch changes do not appear necessary for efficient operation. Hydrofoil surfaces promise much more efficient operation due to the lower slip velocity needed but more testing needs to be done to achieve equally good lift/ drag ratios and cyclical pitch control is necessary for efficient operation at higher speeds in vertical track seawheel craft as shown in FIGURES 1, 2, 3, 4, 9, 10, and 11. FIGURE 4 shows desirable cyclical hydrofoil pitch changes needed at higher speeds. This can be accomplished with the mechanism shown in FIGURES 4, 5, and 6. FIGURE 5 shows a device that will hold either of the two positions it can be set into until activate rod 42 or 43 are depressed to set it to the other position. The spring 45 is under enough compression to hold either position but allows movement of the transfer lever 44 through center. Note that actuate rods can be depressed further than stable position to extra positive or negative attack angles. The left front and rear bottom control wheels 40 in FIGURE 4 create extra negative attack and extra positive attack angles (rod 42, rod 43) respectively on each passing hydrofoil. The front bottom and rear top control wheels 40 trip the actuate rod 43 and rod 42 respectively as that track section passes changing the hydrofoil pitch cyclically as shown. The angle of incidence that water flows past the hydrofoil blades can increase by 20° to 60° on entry and decrease by 20° to 60° on exit from the water while vector sum velocity also increases relative to angle turned in entry or departure from the horizontal. Increased angle of incidence on entry with a fixed pitch craft causes high lift on entry and the decreased exit angle can cause negative lift with the resulting force causing the craft to run with the bow raised at a 20° to 45° angle. This, coupled with a high and rearward center of gravity has caused test models to flip over backwards, especially when accelerating rapidly. Even with cyclic pitch control a forward center of gravity is desirable to oppose the moment couple introduced by a high center of aerodynamic drag and a low center of thrust. At very high speeds a lifting airplane type tail and/or a high positioned thrust device such as an air propeller or jet engine could be needed. FIGURE 9 shows another solution or hydrofoils could be substituted for or used with the planing surface. Tandem fore and aft track units well spaced as FIGURES 10 and 11 show is another solution.

Figure 12:
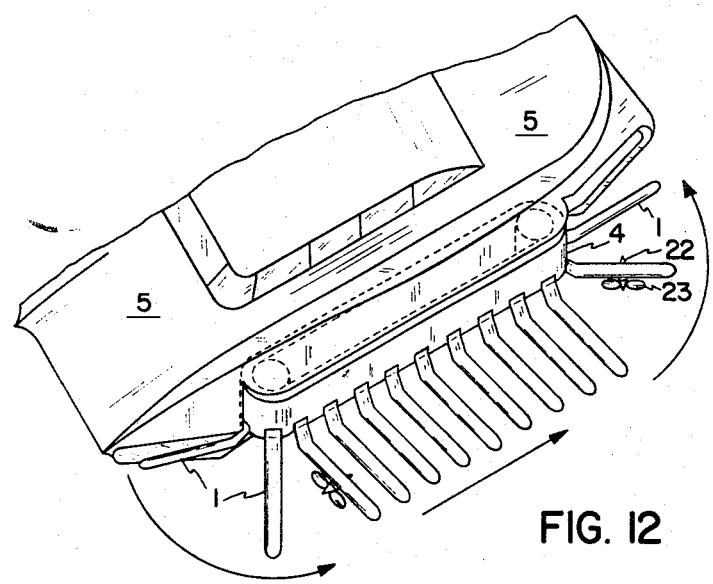
FIGURE 12 is a perspective view of a tilted dual track seawheel watercraft.
Figure 13:
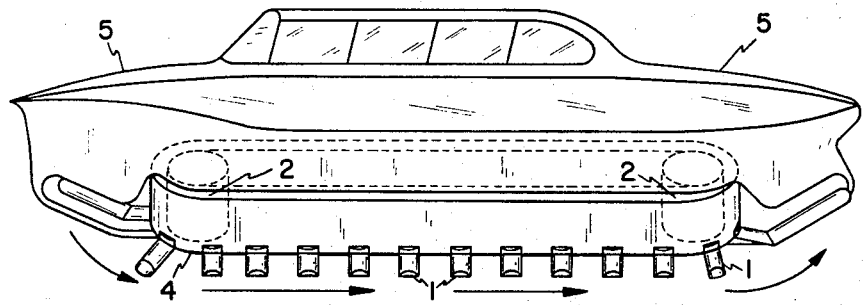
FIGURE 13 is a schematic side view of the craft in FIGURE 12.
Figure 14:
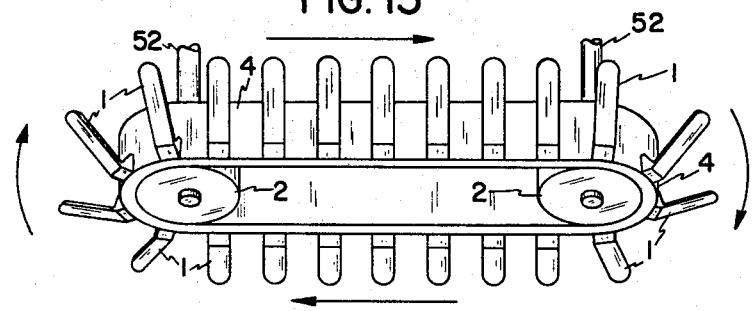
FIGURE 14 is a bottom schematic plan view of one tilted track lift and propulsion unit of the craft in FIGURES 12 and 13.
Figure 18:
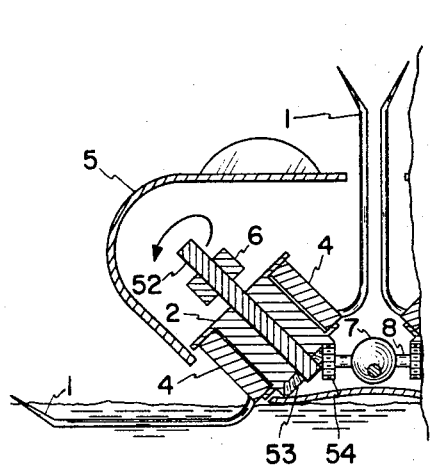
FIGURE 18 is a partial cross section end view of a two unit tilted track seawheel craft utilizing approximately 45° track tilt showing track drive.
Figure 20:
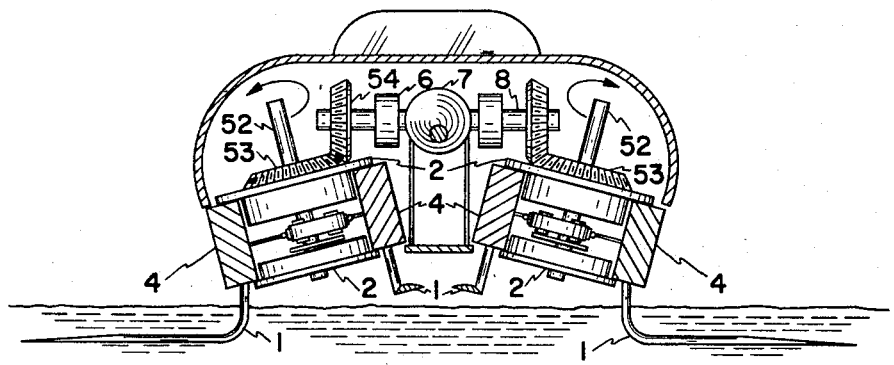
FIGURE 20 is a partial cross section end view of a tilted track seawheel craft utilizing track units similar to that shown in FIGURE 19 where the blades fold to reduce air resistance loss on the forward path and extend on the rearward path.
Figure 21:
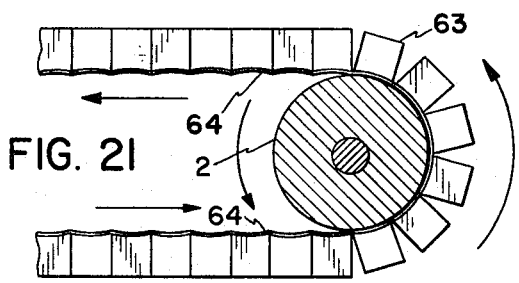
FIGURE 21 is a partial plan view of an external fold track showing multiple section construction allowing travel around the wheels while straightening into a rigid weight supporting structure for sections between the wheels.
Figure 22:
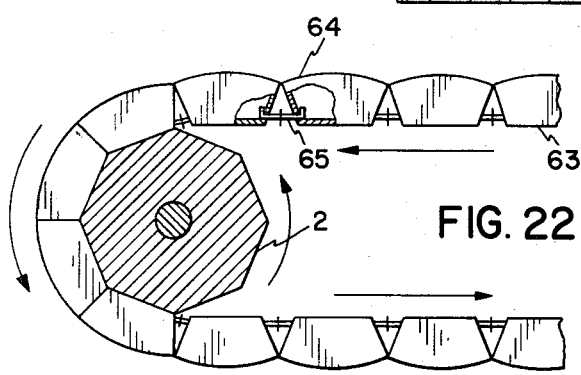
FIGURE 22 is a partial plan view of an internal fold track showing multiple section construction allowing travel around the wheels while straightening into a rigid weight supporting structure.

Tilting the track units as in FIGURES 12, 13, 16, 17, and 18 decreases the actual fixed hydrofoil angle variation for entry and exit from the water with the need for cyclical pitch control rapidly decreasing as tilt of the drive wheel axis approaches 70° to 80° relative to the water surface. The tilted track seawheel craft can offer a low aerodynamic drag center, a low center of gravity, and efficient high speed operation with fixed pitch lift surfaces. As shown the lift surface angle to the drive axis is set to place it roughly horizontal to the water surface during rearward travel contacting the water. Hydrofoil types as FIGURE 17 could use a dihedral angle as do aeroplanes to improve lateral stability. However, available lift decreases as the cosine of the dihedral angle. Drag, drag feedback, auxiliary thrust units, and other construction or combinations previously described apply also to tilted track seawheel craft. Another device applicable to both types but particularly to tilted track craft is the cyclical lift surface fold track shown in FIGURES 19 and 20. A rubberized flexible track 4 is shown moving around wheels 2 with blades 1 that fold near the end of the rearward path in contact with the water when the springy lever arm 58 is actuated by contact with rear wheel 2. The blade 1 and lever arm 58 are attached to form one piece and use pivot brackets 60 as a pivot point. Arm 58 contact with the rear wheel 2 gives a positive fold while the blade travels around the rear wheel; then tension of spring 59 holds the blade folded against air resistance during forward travel. The front wheel 2 is not as thick as rear wheel 2 in FIGURE 19 so that actuate wheel 56 can be placed to contact and actuate lever arms 58 as they pass. As the blades 1 travel around the front wheel 2 the lever arm 58 contacts the actuate wheel 56 positively keeping the blade folded until as the blade 1 starts rearward the centrifugal force and drag of the water when entered gradually unfold the blade 1 with the actuating wheel 56 allowing more and more movement of the lever arm. Thus, as the blade leaves the forward wheel 2 it is completely unfolded and drag of the water against blade 1 holds the blade 1 unfolded against the pull of spring 59 as the blade travels rearward providing lift and thrust to the seawheel craft. If the blade must positively remain folded during forward travel or be damaged, a belt 61 can be added over blade fold actuate wheel 56 and rear wheel 2 to hold lever 58 while moving forward. The blades can also be arranged to fold up or backward, but the fold mechanism is more complicated and efficiency is not as good. The blade 1 pivot axis can be inclined forward or backward, etc. so that when folded the blade 1 axis is almost parallel to air flow over it as the forward returning blades in FIGURE 20 are shown. Since forward velocity of the lift surface blades 7 is about twice that of the seawheel craft the reduction in air drag by folding the blades can be considerable. Further reduction can be effected by providing an enclosed path as shown in FIGURES 12, 13, and 18 to return the blades and track 4 forward inside of and protected from the air flow past a fast moving seawheel craft and from wave or water impact. A bottom plate 66 as shown in FIGURE 18 could be used. Without water drag created by running the track in water, FIGURE 19, all the blades 1 would fold to allow the seawheel craft to tie up alongside a dock or on land would allow operation on a narrow road or trail. A one track unit with about 45 degree tilt, as part of FIGURE 18, with the body and drive above the track would make an excellent amphibious craft useable on narrow mountain trails, snow, mud, highway, water, etc. A pivoting tandem wheel or second track unit could be used to steer.

A rigid lever 58 could be used if desired in the folding mechanism but a spring lever has advantages as follows:

(A) Blade 1 inertia, etc. resists folding action and spring in the lever 58 reduces impact and forces needed to fold the blade. A dashpot or damping mechanism could also be added.

(B) The spring lever bears against a stop on the track limiting unfolding of the blade 1. However, on hitting deadheads or debris in the water the blade can bend the spring lever 58 and pivot an additional 40° or more to effectively shed the debris, etc., without serious damage.

(C) Bending of the spring lever using a second stop against the actuating wheel 56 can fully fold the blade 1 yet spring back to unfold the blade enough after passing to insure that water contact will catch and fully extend the blade 1.

Note that when encountering debris, deadheads, etc., in the water that velocity of the lift surfaces with respect to such material is only the slip velocity that may vary from 10 to 30 miles per hour and is not the forward velocity of the seawheel craft. This low speed minimizes impact with the material. Low inertia of the track unit plus a drive train slip clutch will allow the track to easily match the materials speed without damage whereupon the seawheel craft track will roll up and over to resume speed and continue on its way. The same analysis is applicable when the seawheel craft runs onto a ramp or beach. In planing operation the lift surfaces would probably slip harmlessly over the material cushioned by a layer of water as when a water skier hits a jump ramp.

Lift surfaces capable of high lift to drag ratio are needed to better medium and low speed efficiency of seawheel craft. Several things can be done to better lift/drag ratios as follows:

(1) A good hydrofoil lift section can be used with around 12% thickness and a flat bottom blending into under camber at the trailing edge (see tulin bottom shape for supercavitating hydrofoils).

(2) Use high aspect ratio lift surfaces.

(3) Use a properly designed hydrofoil tip as shown in FIGURES 25 and 26 to reduce vortex losses thus increasing lift without a proportionate increase in drag. Low pressure areas exist at bottom and (more so) top of a hydrofoil in operation causing spanwise flow of water from the tip into the low pressure areas. If the tip is smoothly curved and tapered through about 80° then water is drawn down to the tip and turned to flow spanwise along the wing. Accelerating the tip water downward, therefore, produces extra lift. In FIGURE 26 the tip tapers to a knife edge at 1d and 1a sloping backward also with a flat straight trailing edge section 1c to best suppress a vortex above and following the wing. The blending of hydrofoils into the track at both ends as shown in FIGURES 2, 3 and 5 is designed to reduce vortex and improve lift/drag ratio in the same manner.

(4) Use a buoyant track that provides buoyant lift in addition to lift from the lift surfaces. Buoyant track lift could be designed to provide lifts of 0% to over 100% of vehicle weight. More aerodynamic drag would increase slip velocity varying the load sharing between buoyant track and lift surfaces to satisfy real lift/drag ratio.

(5) Use auxiliary lift as in ground effect machines, captive air bubble machines, helicopters, etc., in combination with a seawheel craft.

(6) Streamline all parts contacting the water and simplify where possible to reduce interference and section drag.

Stability of a lifted out seawheel craft at speed is important. Buoyant track use aids vertical, lateral, and longitudinal stability of the craft. The use of dihedral and/or surface piercing hydrofoils vary lift per unit area in a way to stabilize the craft. Subcavitating hydrofoils rapidly lose lift as immersion decreases less than one chord distance. This effect alone has given satisfactory stability in past model tests. Planing type operation also has given satisfactory stability in model tests. Lowering of the center of gravity gives better stability. Longitudinal stability was previously covered in the cyclic pitch section. Fore-aft and lateral distribution of lift area or track units is desirable for stability.

Figure 17:
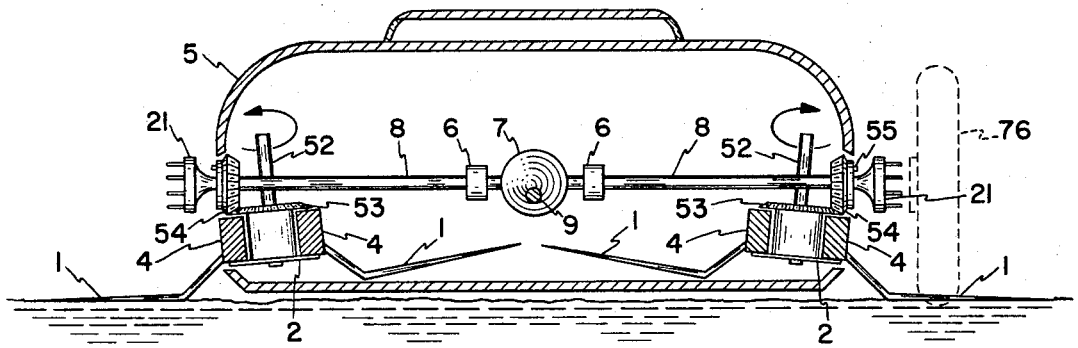
FIGURE 17 is a partial cross section end view of a two unit tilted track seawheel craft showing track drive system.
Figure 19:
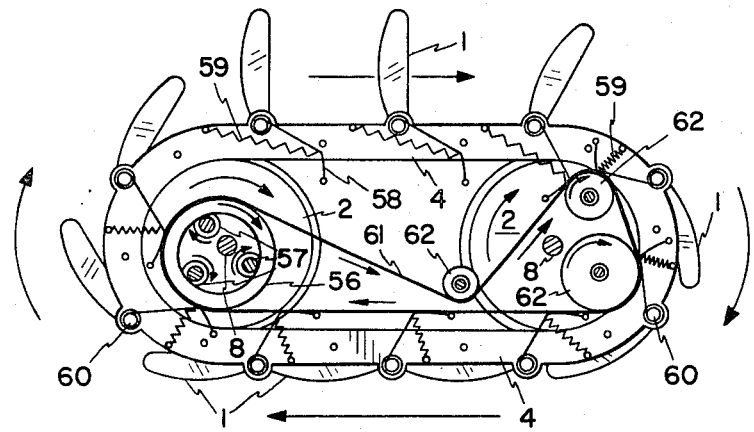
FIGURE 19 is a plan view of a tilted track lift and propulsion unit utilizing hydrofoil blades that cyclically fold and extend with the cyclical fold and extend mechanism shown.

Note the axle to wheel adapter hub 14 or 21 shown in FIGURES 2, 3 or 17. Hub adapter 21 is placed so that pneumatic tires can easily be bolted on for hard surface road travel without a need to remove the track units. In FIGURE 17 a lock pin 55 is provided to easily lock or unlock axle 8 and bevel drive gear 54 permitting road use on pneumatic tires without turning the track unit. In FIGURE 2 the wheel adapter hub 21 allows removal of the wheel-track unit and substitution of pneumatic tires for road use.

Movement of the track and lift surfaces is such that areas touching the ground move straight forward or backward allowing the seawheel craft to operate on hard or soft surfaces in addition to water surfaces without any conversion. Lift surface loading per unit area is small enough to allow operation on snow, mud, or other soft surfaces.

Construction of the continuous track can vary and different forms are shown in FIGURES 4, 14, 15, 19, 21, 22, 23. While cable, chain link, and rubberized flexible tracks can be used the rigid one way bend only track shown in FIGURES 4, 21, 22, or 23 is to be desired. The track in FIGURES 4, 21, and 22 can use a flexible ribbon belt 64 with rigid or semi-rigid sections attached to form the shape shown. Alternately semi-rigid or rigid sections can be hinged together to form the shapes shown. Tension members 65 in FIGURE 22 connect the inside circumference edge of sections to prevent bending with load applied as shown by the arrows. Butting together of the FIGURE 21 track sections prevents bend and holds against a load applied as shown by the arrows. FIGURE 4 is a combination of FIGURE 21 and FIGURE 22 track construction. FIGURE 23 is an overlapping chain link track whose link tips butt on the next link to prevent bending with load applied as shown by the arrows. Note that with thickness and width these tracks will support loading in all but one direction and will resist twisting. This is desirable not only to reduce the number of support wheels needed but to reduce vibration in the track that could be considerable in an unsupported run of flexible track. However, test runs of a model with a flexible track was damped enough by hydrofoil contact with the water that vibration was not detectable during operation.

Figure 15:
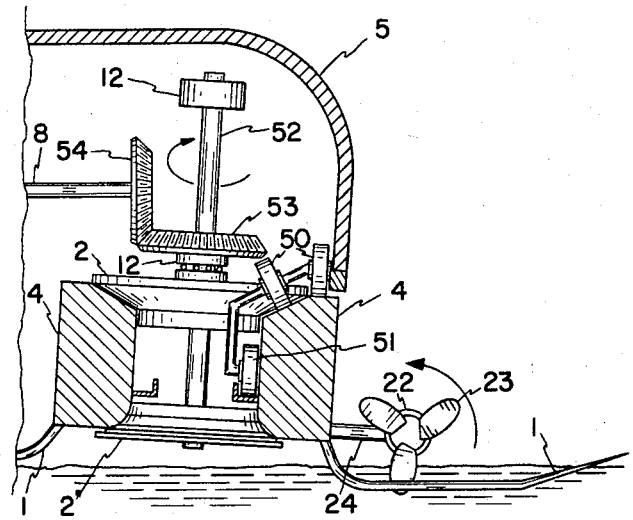
FIGURE 15 is a partial cross section end view of the tilted track unit of FIGURES 12, 13, and 14.
Figure 16:
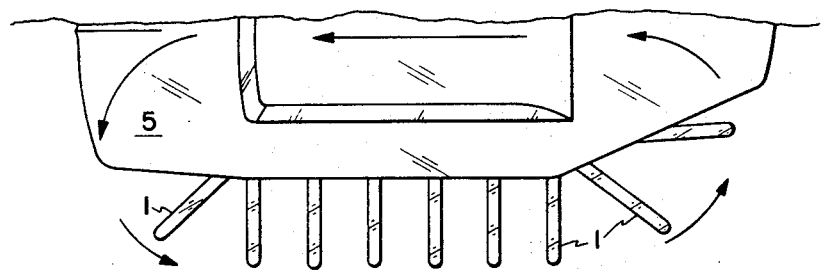
FIGURE 16 is a plan view showing the contact area of the hydrofoils of the tilted track propulsion with the water and the path taken by the hydrofoil tips of each.

In large seawheel craft hull strength considerations may demand more support points than two wheels 2 at opposite track ends. To transfer the load using numerous upper track support wheels 50 as shown in FIGURE 15 to better distribute stress forces on a large hull is desirable when either flexible or rigid track is used. It is also desirable when wheel 2 separation is large in comparison to wheel 2 diameter as it would be to maximize percentage of surfaces contacting the water. Also notice antitwist track support wheel 51 in FIGURE 15 used to oppose moment (twist) forces caused when blade 1 provides lift. The support wheels 50 and/or 51 can be rigidly mounted or spring held to tension the track as well as support it.

Obviously the seawheel craft must be provided buoyancy sufficient to float the craft well and with stability when at rest on the water's surface. Vehicle hull surfaces should also be designed to place enough area rearward from the center of gravity and the center of forward thrust forces to provide unconditional aerodynamic stability at all forward speeds.

Returning to the blade fold mechanism it is seen that forward inclination of the blade fold axis with forward folding blades is advantageous to promote better blade position and pitch changes in going around the end wheels 2 where fold angle is referred to the more forward part of the fold axis. Similarly a semifixed lift surface would be held secure at the top forward part of a pivot axis with an appropriate bearing at the bottom to provide support allowing twist and extension/contraction for travel around the end wheels 2. This would give semifixed surfaces a small forward inclination and negative pitch increment in traveling around the end wheels 2 that is desirable.

In closing note that slip velocity determines basic efficiency of operation which is:

$$\frac{\text{Vehicle Velocity}}{\text{Vehicle Velocity} + \text{Slip velocity}}$$

This and aerodynamic drag form a base in determining best obtainable efficiency and are modified only slightly by auxiliary devices for high speed travel. Aerodynamic drag is proportional to vehicle airspeed squared. A spring loaded pitch mechanism to increase hydrofoil pitch over initial pitch with slip velocity increase may be needed to get the required thrust for very high vehicle speeds by decreasing lift/drag ratio or auxiliary flaps can be used.

Although only one prime mover is shown in the drawings for a craft drive system, each track may be driven by one or more individual prime movers or share prime mover power in other ways. Adaptation to maintain like slip velocities and to steer the vehicle are obvious.

The drawings show varied embodiments of the invention and such embodiments are described. It will be understood that various changes may be made from the construction disclosed, and that the drawings and description are not to be construed as defining or limiting the scope of the invention, the claims forming a part of this specification being relied upon for that purpose. It is intended to cover in the appended claims all such changes and modifications that come within the true spirit and scope of the invention.

What I claim is:

1. In a hydrofoil vehicle, endless track means traversing around spaced wheels at least one of which drives the track means; hydrofoil blades carried by said track means in spaced relation one to another with a substantial open gap disposed lengthwise of the track means between successive blades such that a plurality of the hydrofoil blades will be displaced in a generally horizontal plane through the water at any given time, the orientation of said hydrofoil blades being automatically adjusted at predetermined locations along the path traversed by the track means, power means to rotate the wheel, displace the track means and successively force the hydrofoil blades through the water each in a generally horizontally extending position to simultaneously lift and propel the hydrofoil vehicle.

2. In a vehicle as defined in claim 1 further comprising drag means selectively responsive to relative movement between the vehicle and the water to facilitate partial recovery of the energy expended by the power means.

3. In a hydrofoil vehicle as defined in claim 1 wherein said track means are buoyant such that at least one half of the portion of the vehicle track means which carry blades engaging the water at a given time is exposed above the surface of the water.

4. In a hydrofoil vehicle as defined in claim 1 wherein said track means are angularly disposed with respect to the horizontal and have projecting hydrofoil blades which each contain an elbow so that the major axis of each blade is generally horizontally situated when the blade is within the water.

5. In a hydrofoil vehicle as defined in claim 1 wherein the lengthwise portions of said track means are generally vertically spaced one from another.

6. In a hydrofoil vehicle as defined in claim 1 wherein said spaced hydrofoil blades are attached to the track means to accommodate selected movement of blades relative to the track, each of said hydrofoil blades being responsive to a reciprocable lever, the movement of which is determined by serial displacement of plungers projecting inward from the track and progressively depressable by actuating wheels adjacent the track whereby each hydrofoil blade is serially moved relative to the track means at predetermined locations.

7. In a hydrofoil vehicle as defined in claim 6 wherein said hydrofoil blades each have a leading tip portion curving smoothly away from the remainder of the blade and progressive tapering to a very thin edge which is disposed approximately perpendicular to the remainder of the blade and which extends a substantial distance rearward of the remainder of the blade such that the vortex motion of water passing over the blade surface is appreciably reduced.

8. In a hydrofoil vehicle as defined in claim 1 wherein said track means comprises at least two power-driven tracks each carrying a series of hydrofoil blades and further comprising at least two maneuvering control means to cause differential displacement as between the tracks to turn the vehicle.

9. In a hydrofoil vehicle as defined in claim 1 further including attachment means at said driving wheel to make the vehicle amphibious by accommodating installation of ground-engaging wheels to facilitate land travel.

10. In a track hydrofoil vehicle which accommodates high speed travel upon the surface of water, a vehicle body, at least two revolving primary wheels with an endless flexible track spanning between the wheels, a plurality of spaced pivot brackets permanently attached to the endless track, a hydrofoil blade pivotally connected near one end thereof to the track at each pivot bracket such that the hydrofoil blade is selectively rotatable from a folded position generally axial paralleling the track to an open position angularly related to the track; bias means to selectively urge each hydrofoil blade toward the folded position and means enabling and disabling the bias means at predetermined locations along the path of the endless track to (a) to open each hydrofoil blade just prior to engaging the water and (b) to fold each hydrofoil blade subsequent to emerging from the water.

11. In a hydrofoil vehicle, endless track means traversing around spaced wheels at least one of which drives the track means; hydrofoil blades supported in cantilevered relation by said track means in spaced relation one to another with a substantial open gap disclosed length-wise of the track means between successive blades such that a plurality of blades will be displaced in a common plane through water at any given time, power means to rotate the wheel, displace the track means and successively force the hydrofoil blades through the water to simultaneously lift and propel the hydrofoil vehicle.

12. In a track-driven hydrofoil vehicle which accommodates high-speed travel upon the surface of water, a vehicle body, at least two revolving primary wheels with an endless flexible track spanning between the wheels, a plurality of spaced pivot brackets permanently attached to the endless track, a hydrofoil blade pivotally connected near one end thereof to the track at each pivot bracket such that the hydrofoil blade is selectively rotatable from a folded position generally axially paralleling the track through an open position angularly related to the track; bias means to selectively urge each hydrofoil blade toward the folded position and means enabling and disabling the bias means at predetermined locations along the path of the endless track to at least partially open each hydrofoil blade at selected locations along the path of the endless track and to fold each hydrofoil blade at selected other locations.

13. In a hydrofoil vehicle according to claim 1 comprising means automatically adjusting the orientation of each hydrofoil (a) so that the leading tip of each blade becomes outwardly disposed at an acute angle away from the track means in a direction counter to intended vehicle movement as each blade approaches the water and the horizontal plane through the water, and (b) so that said leading tip becomes inwardly disposed at an acute angle toward the track means in a direction counter to intended vehicle movement as each blade approaches the end of the horizontal plane through the water and is about to leave the water.

References Cited

UNITED STATES PATENTS

| | | | |
|---|---|---|---|
| 1,831,835 | 11/1931 | Allee | 115—.5 XR |
| 2,091,958 | 9/1937 | Braga | 115—63 X |
| 2,315,027 | 3/1943 | Svenson | 115—19 |
| 2,488,310 | 11/1949 | Mayer | 115—19 |
| 2,941,494 | 6/1960 | McBride | 115—63 |
| 3,125,981 | 3/1964 | Reynolds | 114—66 |

FOREIGN PATENTS

| | | |
|---|---|---|
| 608,514 | 4/1926 | France. |

ANDREW H. FARRELL, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,654            October 1, 1968

Wayne Wilson

It is certified that error appears in the above identified patent and that said Letters Patent are hereby corrected as shown below:

Column 1, line 37, "more" should read -- move --. Column 4, line 26, "lift hydrofoil" should read -- lift of hydrofoil --; line 32, "20" should read -- 26 --. Column 5, line 67, "in" should read -- is --. Column 6, line 61, "more" should read -- mode --.

Signed and sealed this 17th day of March 1970.

(SEAL)
Attest:

Edward M. Fletcher, Jr.            WILLIAM E. SCHUYLER, JR.
Attesting Officer            Commissioner of Patents